(12) United States Patent
Kwok et al.

(10) Patent No.: US 6,196,596 B1
(45) Date of Patent: Mar. 6, 2001

(54) QUICK CONNECT/DISCONNECT COAXIAL HOSE ASSEMBLY

(75) Inventors: Kui-Chiu Kwok, Mundelein; Kenneth H. Dorman, Carol Stream, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/197,245

(22) Filed: Nov. 20, 1998

(51) Int. Cl.[7] .................................................. F16L 19/00
(52) U.S. Cl. .............................. 285/123.1; 285/123.15; 285/25.5; 285/297
(58) Field of Search ........................... 285/120.1, 123.3, 285/123.15, 255, 247, 279, 123.1

(56) References Cited

U.S. PATENT DOCUMENTS

| | | | |
|---|---|---|---|
| 16,450 | * 1/1857 | Phillips | 285/247 |
| 1,160,703 | 11/1915 | Fleming . | |
| 1,521,482 | 12/1924 | Steele . | |
| 2,551,536 | * 5/1951 | Harvey | 285/247 |
| 3,498,647 | 3/1970 | Schroder . | |
| 3,820,827 | 6/1974 | Boelkins . | |
| 3,980,112 | * 9/1976 | Basham | 285/123.15 |
| 4,116,475 | 9/1978 | Glaser et al. . | |
| 4,149,739 | 4/1979 | Morris . | |
| 4,345,668 | 8/1982 | Gaunt . | |
| 4,732,414 | * 3/1988 | Inaba | 285/123.15 |
| 4,871,196 | * 10/1989 | Kingsford | 285/123.1 |
| 4,919,334 | 4/1990 | Hartmann et al. . | |
| 4,922,971 | 5/1990 | Grantham . | |
| 5,011,193 | * 4/1991 | Porte | 285/123.15 |
| 5,088,774 | 2/1992 | Spiegelman . | |
| 5,451,031 | 9/1995 | Purvis et al. . | |
| 5,454,603 | * 10/1995 | Staley | 285/123.1 |
| 5,934,712 | * 8/1999 | Friedrich et al. | 285/123.15 |

OTHER PUBLICATIONS

Environmentally Safe Lubricants and Micro–Lubrication Systems, ITW Fluid Products Group, Acculube, 12 pages.

* cited by examiner

Primary Examiner—Lynne H. Browne
Assistant Examiner—Aaron Dunwoody
(74) Attorney, Agent, or Firm—Schwartz & Weinrieb

(57) ABSTRACT

A quick connect/disconnect coaxial hose assembly comprises male and female half hose assemblies wherein the half hose assemblies respectively comprise a male and female connector, an outer tube member for conducting a first fluid therethrough, an inner tube member for conducting a second fluid therethrough, a joint retainer nut member for securing the male and female connectors together, and a sleeve member mechanically and fluidically connecting axially inner ends of the inner tube members together. Threaded disengagement of the joint retainer nut member releases the male and female connectors from each other, whereby the half hose assemblies may be readily pulled apart in opposite axial directions disengaging the axially inner end of one of the inner tube members from the sleeve member so as to achieve quick disconnection of the hose assembly. Subsequent axial engagement of the inner end of the inner tube member with the sleeve member, insertion of the male connector within the female connector, and re-engagement of the joint retainer nut member achieves quick connection of the hose assembly.

20 Claims, 2 Drawing Sheets

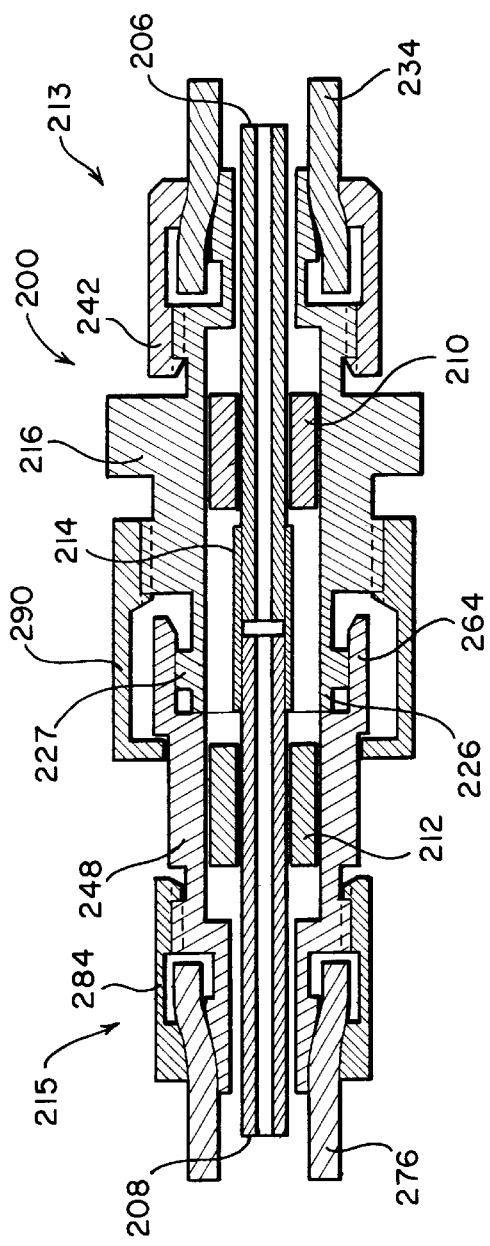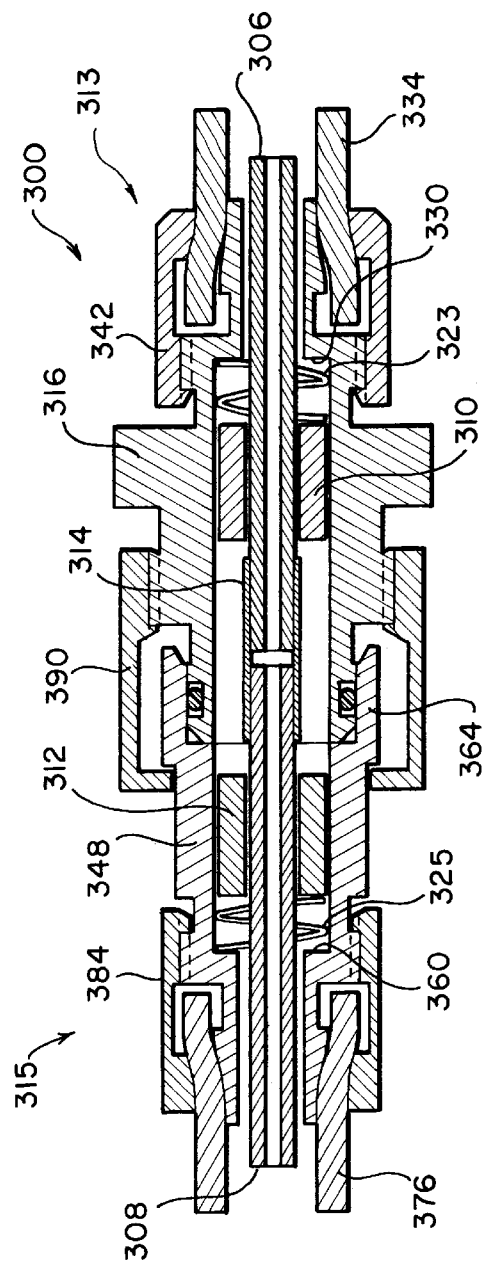

QUICK CONNECT/DISCONNECT COAXIAL HOSE ASSEMBLY

FIELD OF THE INVENTION

The present invention relates generally to coaxial pipe, tube, and/or hose connection assemblies, and more particularly to a coaxial pipe, tube, and/or hose connection assembly which is particularly adapted for use in connection with power tools which employ such a system or assembly in order to simultaneously supply power-driving or coolant air and lubricant to the power tool.

BACKGROUND OF THE INVENTION

Coaxial pipe, tube, and/or hose connection assemblies, particularly those which are used to supply a combination of power-driving or coolant air and lubricating oil to power tools, are known in the art. Exemplary of one type of such known prior art is the fitting or assembly disclosed in U.S. Pat. No. 4,116,475, which issued to Glaser et al. on Sep. 26, 1978. In accordance with such typical or conventional prior art assemblies or fittings, a quick disconnect coaxial coupling socket 17 is disclosed in FIG. 1, for example, as comprising a male pipe threaded fitting 18 within which there is disposed a central or axial tube 24, for mating with a barbed insert 13 of an injection lubricator so as to conduct a suitable lubricant therethrough, and a surrounding annular air passage 19. A three-legged spacer or locator 26 radially supports the axially disposed lubricant tube 24 with respect to the housing 18 and the air passage 19. Other similar embodiments are disclosed in FIGS. 2 and 3.

While the aforenoted patent to Glaser et al. discloses a typical coaxial pipe or tubular assembly or connector for conducting a combination of fluids therethrough, such as, for example, air and a lubricating oil, such an assembly is not directed to an assembly of the type which can readily accommodate coaxially disposed hoses and connections between hose sections. It is frequently required in connection with the use of such hose assemblies upon, for example, cutting tools or the like, to shorten or lengthen or otherwise change or replace the hose sections or assemblies. In addition, in order to minimize operational downtime as much as possible, the exchange or replacement process must be able to be accomplished relatively quickly and easily. These criteria cannot be readily satisfied or met with the assembly of Glaser et al.

While the patent to Glaser et al. characterizes the structural assembly thereof as being of the quick disconnect/connect type, it is seen that the entire coupling socket 17, comprising male pipe threaded fitting 18, must be rotated relative to the fitting 10 in order to mount the coupling socket 17 upon the fitting 10 as a result of the threaded engagement of the male pipe threaded fitting 18 of the coupling socket 17 and the female pipe thread 11 of the fitting 10. This is difficult or awkward to accomplish whereby the assembly may not necessarily be considered a quick connect/disconnect type assembly. In addition, it is noted that due to the axially recessed disposition of the barbed insert 13 within the fitting 10, it is sometimes difficult to properly coaxially align the barbed insert 13 with the grommet 21 in order to provide fluidic communication between tubes 16 and 24 of the fitting 10 and socket 17 because the forward end of the coupling socket 17 is already partially disposed internally of the fitting 10 before the barbed insert 13 can engage the grommet 21.

Another quick disconnect coupling for coaxial fluid lines is disclosed in U.S. Pat. No. 3,820,827 which issued to Boelkins on Jun. 28, 1974. The quick connection/disconnection process of such coupling, however, is relatively complex. More particularly, the coupling assembly comprises a plurality of locking balls 22 and a slidable sleeve 26 mounted upon a valve body member 18 of a socket portion 10. In addition, a sleeve valve 32 is also slidably mounted upon the body member 18. In order to therefore disconnect the plug portion 12 from the socket portion 10, the sleeve valve 32 must first be moved to the left as shown in FIG. 2 whereupon the locking mechanism sleeve 26 can then also be moved to the left so as to release the locking balls 22 and thereby allow the plug portion 12 to be withdrawn from the socket portion 10.

It is also desirable from a manufacturing and assembly point of view that the mating hose sections of the coaxial hose assembly be substantially identical or at least complementary with respect to each other to the greatest possible extent. In addition, from an operational point of view, whereby the various fluids are able to flow through the hose assemblies with maximized flow efficiency and minimized flow resistance, substantially straight-through axial flow paths are desired. Still further, the hose assemblies must be provided with a requisite amount of structural integrity so as to ensure proper and desired mechanical interconnection between the various components of the assembly as well as to ensure the integrity of the fluidic communication between the hose sections. U.S. Pat. No. 4,732,414 which issued to Inaba on Mar. 22, 1988 and U.S. Pat. No. 1,160,703 which issued to Fleming on Nov. 16, 1915 are exemplary of additional coaxial pipe joint assemblies wherein substantially axial flow of both the inner and outer fluids through the assemblies are provided. It is noted, however, that aside from the external joint nut or joint body 1 and 26, respectively, there is no provision of a mechanical joint or interengaging interface between the pipe components because the joint interfaces of both patented assemblies are of the butt-joint type which also require packing 25 and 29, respectively.

A need therefore exists in the art for a quick connect/disconnect coaxial hose assembly which in fact readily enables quick and easy connection and disconnection of the hose assemblies, which is comprised of substantially identical or complementary component parts, which provides substantially axial flow-through of the dual fluids, and which provides good mechanical interconnections so as to ensure both structural and fluidic integrity of the assembly.

OBJECTS OF THE INVENTION

Accordingly, it is an object of the present invention to provide a new and improved quick connect/disconnect coaxial hose assembly for conducting dual fluids therethrough.

Another object of the present invention is to provide a new and improved quick connect/disconnect coaxial hose assembly for conducting dual fluids therethrough and wherein such hose assembly overcomes the various drawbacks characteristic of the prior art assemblies.

An additional object of the present invention is to provide a new and improved quick connect/disconnect coaxial hose assembly for conducting dual fluids therethrough and wherein such hose assembly comprises substantially identical or complementary component parts.

A further object of the present invention is to provide a new and improved quick connect/disconnect coaxial hose assembly for conducting dual fluids therethrough in a substantially axial manner and wherein the component parts of such hose assembly provide good mechanical interconnections so as to ensure both the structural and fluidic integrity of the assembly.

SUMMARY OF THE INVENTION

The foregoing and other objects are achieved in accordance with the teachings of the present invention through the provision of a new and improved quick connect/disconnect coaxial hose assembly which comprises a pair of outer tubular members fabricated, for example, from polyurethane, and a pair of inner tubular members fabricated, for example, from nylon, and wherein the assembly further comprises connector members for quickly and easily connecting free end portions of the inner and outer tubular members in a coaxial manner so as to provide for the dual coaxial transmission of lubricant and air fluids through the inner and outer tubular members.

More particularly, the connector members of the hose assembly comprise a tubular male connector upon an external portion of which a free end of a first one of the outer polyurethane tubes is secured by a first threaded tube retainer. In a similar manner, the free end of a second one of the outer polyurethane tubes is secured by a second threaded tube retainer upon an external portion of a tubular female connector. Each one of the inner nylon tubes is respectively disposed internally within one of the outer polyurethane tubes as well as within one of the tubular male and female connectors, and a pair of centering spacers are respectively disposed around the inner nylon tubes and within the internal bores of the male and female connectors so as to maintain the inner nylon tubes properly coaxially disposed within the male and female connectors. A central sleeve member is disposed about the internally mating free ends of the inner nylon tubes so as not only to, in effect, mechanically interconnect the nylon tubes together, but in addition, to ensure the integrity of the fluidic flow of the lubricant through the nylon tubes. An external, threaded joint nut, which in effect threadedly connects the male and female connectors, and more particularly, respective hose assembly halves together, completes the hose assembly.

When it is desired to disconnect the respective hose assembly halves, the external threaded joint nut, which is slidably disposed upon the female connector, is threadedly disengaged from an externally threaded portion of the male connector, and the male and female connectors are simply pulled apart in opposite axial directions. Such an operation disengages the male connector from its internal disposition within the female connector, and in addition, causes separation of the free end of one of the inner nylon tubes from the central sleeve member which remains secured upon the free end of the other one of the inner nylon tubes.

In order to reconnect the respective hose assembly halves, or to exchange or replace one of the respective hose assembly halves with a new or different hose assembly half, the male connector, having the first one of the outer polyurethane tubes disposed thereon and a first one of the inner nylon tubes disposed therein, is axially inserted into the female connector, having the second one of the outer polyurethane tubes disposed thereon and a second one of the inner nylon tubes disposed therein, so as to, in effect, define therewith the outer annular air passageway through the hose assembly. At substantially the same time, the sleeve member, which may, for example, have been retained upon the first one of the inner nylon tubes operatively associated with the male connector, is easily axially mated with the free end of the second one of the inner nylon tubes operatively associated, for example, with the female connector. When the male and female connectors are fully mated with each other, whereby the sleeve member is also fully or properly seated upon the free end of the second one of the inner nylon tubes, the external joint nut is subsequently threadedly re-engaged with the externally threaded portion of the male connector, whereby the re-connection of the hose assembly is completed, locked, and secured.

BRIEF DESCRIPTION OF THE DRAWINGS

Various other objects, features, and attendant advantages of the present invention will be more fully appreciated from the following detailed description when considered in connection with the accompanying drawings in which like reference characters designate like or corresponding parts throughout the several views, and wherein:

FIG. 2 is a longitudinal, axial cross-sectional view similar to that of FIG. 1 showing, however, a second embodiment of the new and improved quick connect/disconnect coaxial hose assembly of the present invention; and FIG. 3 is a longitudinal, axial cross-sectional view similar to those of FIGS. 1 and 2 showing, however, a third embodiment of the new and improved quick connect/disconnect coaxial hose assembly of the present invention.

DETAILED DESCRIPTION OF THE PREFERRED EMBODIMENT

Figure 1:
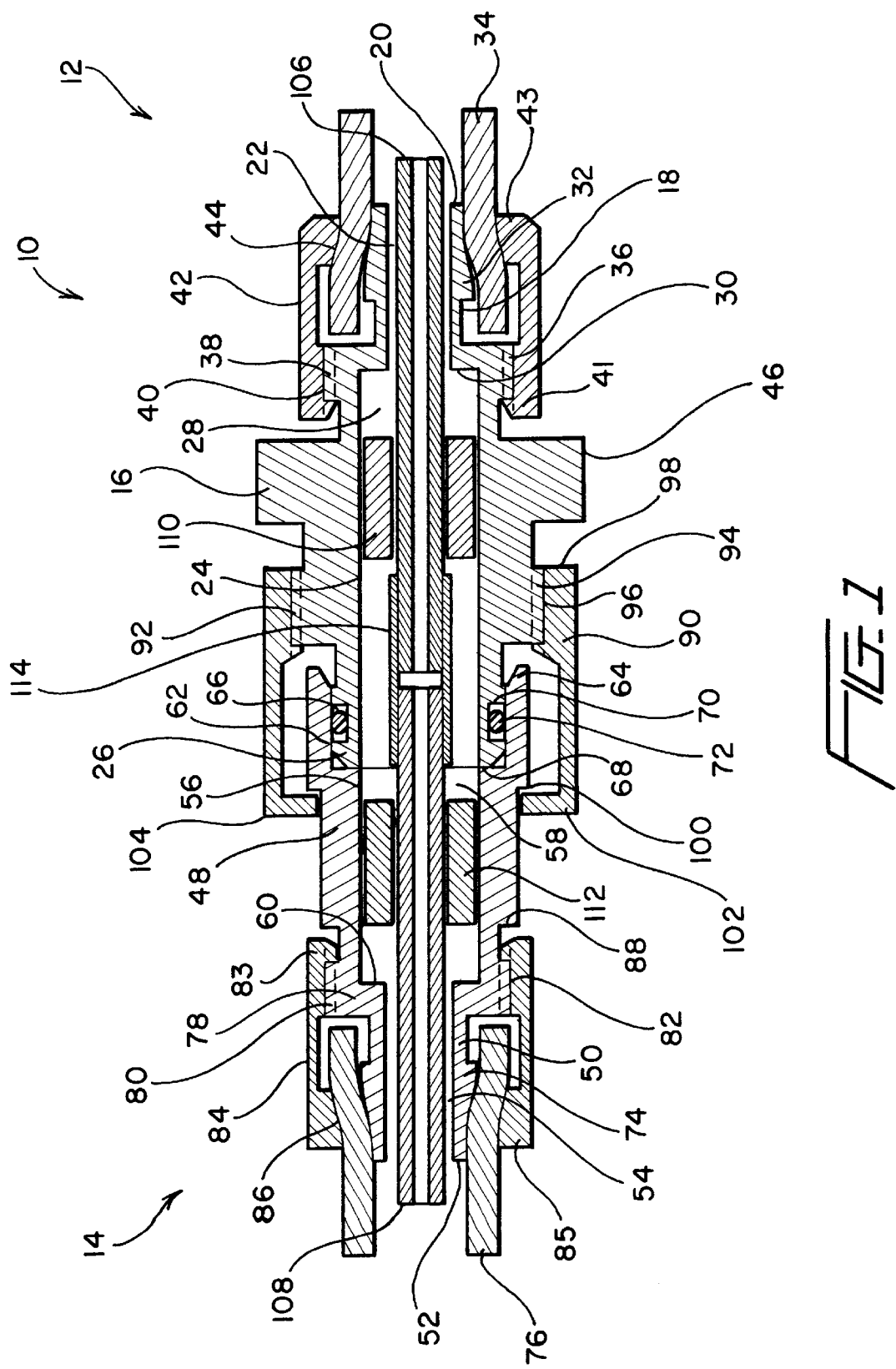
FIG. 1 is a longitudinal, axial cross-sectional view of a first embodiment of the new and improved quick connect/disconnect coaxial hose assembly constructed in accordance with the teachings and principles of the present invention and showing the cooperative parts thereof.

Referring now to the drawings, and more particularly to FIG. 1 thereof, the new and improved quick connect/disconnect coaxial hose assembly constructed in accordance with the teachings and principles of the present invention is disclosed and generally indicated by the reference character 10. More particularly, the quick connect/disconnect coaxial hose assembly 10 comprises, in effect, two mating half hose assemblies, that is, a male half hose assembly 12 and a female half hose assembly 14. Considering first the male half hose assembly 12, the latter comprises a tubular male connector 16 which has an internally stepped configuration defined by a first annular wall member 18 extending axially inwardly and forwardly from an axially outer or rearward end portion 20 so as to define a first relatively small internal bore region 22, and a second annular counterbored wall member 24 extending axially inwardly and rearwardly from an axially inner or forward end portion 26 so as to define a second relatively large internal bore region 28, the wall members 18 and 24 defining a shoulder portion 30 at the interface or intersection thereof.

The axially outer or rearward end portion 20 of the male connector 16 comprises an external surface portion 32 which has a substantially frusto-conical configuration and is adapted to have a free or open end of a first outer tube member 34 mounted thereon. The male connector 16 also comprises a second external surface portion 36, at an axial position which is substantially coincident with the stepped shoulder portion 30, which is provided with external threads 38 for mating with an internally threaded portion 40 provided upon a first end portion 41 of a first tube retainer nut 42. The opposite or second end portion 43 of the tube retainer nut 42 is provided with an internal frusto-conical portion 44 which is substantially similar or complementary to the external frusto-conical portion 32 of the male connector 16. In this manner, when the free or open end of the first outer tube member 34 is mounted or disposed upon the external surface portion 32 of the male connector 16, and the respective threaded portions 38 and 40 of the male connector 16 and the tube retainer nut 42 are threadedly engaged with each other such that the tube retainer nut 42 is axially moved upon the male connector 16 in a tightening direction, the frusto-conical surfaces 32 and 44 of the male connector 16 and tube retainer nut 42 wedgingly secure the open or free end of the outer tube member 34 upon the male half hose assembly 12. The male connector 16 also comprises a radially enlarged flanged portion 46 at a substantially axially central portion thereof, and when the tube retainer nut 42 is fully tightened upon the male connector 16, the first end portion 41 of the tube retainer nut 42 will engage the flanged portion 46 of the male connector 16.

The female half hose assembly 14 is substantially identical to the male half hose assembly 12 except for the obvious male-female engagement portions which will be discussed shortly. More particularly, the female half hose assembly 14 comprises a tubular female connector 48 which has an internally stepped configuration defined by a first annular wall member 50 extending axially inwardly and forwardly from an axially outer or rearward end portion 52 so as to define a first relatively small internal bore region 54, and a second annular, first counterbored wall member 56 so as to define a second relatively large internal bore region 58. The wall members 50 and 56 define a first annular shoulder portion 60 at the interface or intersection thereof, and the tubular female connector 48 is seen to further comprise a third annular, second counterbored wall member 62 which extends axially inwardly and rearwardly from an axially inner or forward end portion 64 so as to define a third relatively large internal bore region 66. The wall members 62 and 56 define a second annular shoulder portion 68, and it is therefore seen that the second relatively large internal bore region 58 is defined or extends between the shoulder portions 60 and 68. In addition, when the male and female connectors 16 and 48 are engaged with each other and connected together, the forward end portion 26 of the male connector 16 is accommodated within the internal bore or socket region 66 of the female connector 48 and is adapted to abut annular shoulder portion 68 of the female connector 48. The forward end portion 26 of the male connector 16 also comprises an annular recessed portion 70 within which an annular O-ring sealing member 72 is disposed so as to provide fluidic sealing of the internal bore regions 28 and 58 of the assembly 10 as will be appreciated shortly.

The axially outer or rearward end portion 52 of the female connector 48 comprises a first external surface portion 74 which is similar to the external surface portion 32 of the male connector 16 and has a substantially frusto-conical configuration which is adapted to have a free or open end of a second outer tube member 76 mounted thereon. The female connector 48 also comprises a second external surface portion 78, at an axial position which is substantially coincident with the first shoulder portion 60, which is provided with external threads 80 for mating with an internally threaded portion 82 provided upon a first end portion 83 of a second tube retainer nut 84. The opposite or second end portion 85 of the second tube retainer nut 84 is provided with an internal frusto-conical portion 86 which, similar to frusto-conical portion 44 of the first tube retainer nut 42, is complementary to the external frusto-conical portion 74 of the female connector 48. In this manner, when the free or open end of the second outer tube member 76 is mounted or disposed upon the external surface portion 74 of the female connector 48, and the respective threaded portions 80 and 82 of the female connector 48 and the second tube retainer nut 84 are threadedly engaged with each other such that the second tube retainer nut 84 is axially moved upon the female connector 48 in a tightening direction, the frusto-conical surface portions 74 and 86 of the female connector 48 and the second tube retainer nut 84 wedgingly secure the open or free end of the second outer tube member 76 upon the female half hose assembly 14. The female connector 48 is further provided with a first external, radially outward flanged portion 88, and when the second tube retainer nut 84 is fully tightened upon the female connector 48, the first end portion 83 of the second tube retainer nut 84 will substantially engage the flanged portion 88 of the female connector 48.

In order to complete the mechanical interconnection of the male and female half hose assemblies 12 and 14 and thereby establish the quick connect/disconnect coaxial hose assembly 10, as will be more fully appreciated shortly, a joint retainer nut member 90 is slidably disposed upon the female connector 48. A third external surface portion 92 of the male connector 16 is provided with external threads 94 for mating with an internally threaded portion 96 of a first end portion 98 of the joint retainer nut member 90. The female connector 48 also comprises a second external flanged portion 100 while the joint retainer nut member 90 is provided with a radially inwardly extending flanged portion 102 at a second opposite end 104 thereof. Consequently, when the threaded portions 94 and 96 of the the male connector 16 and the joint retainer nut member 90 are threadedly engaged, flanged portion 102 of joint retainer nut member 90 engages flanged portion 100 of the female connector 48 so as to retain the male and female connectors 16 and 48 engaged with each other through means of the engagement of their inner end portions 26 and 64.

In order to complete the entire hose assembly 10 and provide for the dual, coaxial transmission of two different fluids through the assembly 10, each one of the male and female half hose assemblies 12 and 14 is also respectively provided with an inner tube member 106 and 108. The inner tube member 106 is coaxially disposed interiorly of the first outer tube member 34 of the male half hose assembly 12 and is disposed within the internal bore regions 22 and 28 thereof, and similarly, inner tube member 108 is coaxially disposed interiorly of the second outer tube member 76 of the female half hose assembly 14 and is disposed within the internal bore regions 54 and 58 thereof. In order to maintain the coaxial disposition of the inner tube members 106 and 108 with respect to the outer tube members 34 and 76, spacers 110 and 112 are respectively disposed internally within the male and female connectors 16 and 48 and are disposed externally about the inner tube members 106 and 108. The spacers 110 and 112 are conventional three-legged spacers which in effect support the inner tube members 106 and 108 with respect to the male and female connectors 16 and 48 and also permit fluid flow thereabout. The spacers 110 and 112 may, for example, be press-fitted upon the internal diameter or peripheral wall portions of the male and female connectors 16 and 48, but may have internal diameter dimensions which are just slightly larger than the outer diameters of inner tube members 106 and 108. Spacers 110 and 112 may be fabricated as molded components from suitable plastic material, such as, for example, polypropylene or nylon.

Consequently, as can be appreciated, a first fluid, such as, for example, an oil or lubricant, can be axially transmitted through the inner tube members 106 and 108, while a second fluid, such as, for example, air can be axially conducted through the first outer tube member 34, the bore regions 22 and 28 of the male connector 16, through the spacer 110, and subsequently through the bore region 58 of the female connector 48, through the spacer 112, through the bore region 54 of the female connector 48, and out through the second outer tube member 76. In order to provide good mechanical interconnection between the inner ends of the inner tubes 106 and 108, as well as to ensure the integrity of the fluidic communication or transmission of the oil or lubricant through the inner tube members 106 and 108, a single sleeve member 114 is disposed about and envelops both inner end portions of the inner tubes 106 and 108. It is noted that the first and second outer tube members 34 and 76 may be fabricated from any suitable material and may comprise any conventional construction which is adapted to conduct pressurized fluids therethrough, and as an example, the outer tube members 34 and 76 may be fabricated from polyurethane. Inner tube members 106 and 108 may be fabricated from, for example, nylon, and the sleeve member 114 may also be fabricated from a relatively rigid plastic material, such as, for example, nylon, polyethylene, or polypropylene.

When the half hose assemblies 12 and 14 of the overall hose assembly 10 are to be disengaged from each other, the joint retainer nut member 90 is threadedly disengaged from the male connector 16 and the two half hose assemblies 12 and 14 are simply pulled apart in opposite directions. The male connector 16 will separate from the female connector 48 as a result of the disengagement of the inner end portion 26 of the male connector 16 being disengaged from the inner end portion 64 of the female connector 48. In addition, the inner tube 108 of the female half hose assembly 14 will be disengaged from the sleeve member 114. In view of the fact that the sleeve member 114 is disposed upon the inner ends of the inner tubes 106 and 108 through means of, for example, a friction fit, the sleeve member 114 will always be maintained, for example, upon the inner tube 106 of the male half hose assembly 12 by disposing a greater axial length portion of the sleeve member 114 upon the inner tube 106 of the male half hose assembly 112 than a corresponding axial length portion of the sleeve member 114 upon the inner tube 108 of the female half hose assembly 14. Of course, these interrelationships can in effect be reversed if it is desired to maintain the sleeve member 114 upon the inner tube 108 when the half hose assemblies 12 and 14 are separated from each other. It is also noted that in view of the fact that the outer diameter of the sleeve member 114 is greater than the inner diameter of the spacers 110 and 112, the provision of the sleeve member 114 upon the inner ends of the inner tubes 106 and 108 by means of the aforenoted friction also ensures that the inner tubes 106 and 108 cannot inadvertently be removed or disengaged from their respective half hose assemblies 12 and 14.

It is further noted that in connection with the particular axial disposition of the sleeve member 114 upon the inner tubes 106 and 108 that the left end of the sleeve member 114 as viewed in FIG. 1 is disposed at an axial position which in effect is substantially coplanar with the open or inner end portion 26 of the male connector 16. In a similar manner, the inner end of the inner tube 108 is also disposed at an axial position which in effect is substantially coplanar with the inner end portion 64 of the female connector 48. In this manner, when the half hose assemblies 12 and 14 are to be engaged or connected to each other, after, for example, one of the half hose assemblies 12 or 14 has been replaced, exchanged, or the like, axial mating of the sleeve member 114 and the inner end of the inner tube 108 is readily simplified because both inner end portions of such members or components 114 and 108 are located within externally accessible radially extending planar regions of their respective half hose assemblies 12 and 14. Once the sleeve member 114 and the inner end of the inner tube member 108 have been initially mechanically mated, and the operator personnel can in fact readily feel or sense such mating, the half hose assemblies 12 and 14 are simply pushed together in opposite axial directions whereupon the inner end portion 26 of the male connector 16 will be fully inserted within and mechanically mated or engaged with the inner end portion 64 of the female connector 48. Threaded engagement of the joint retainer nut member 90 with the third externally threaded portion 92,94 of the male connector 16 then completes the assembly or connection of the half hose assemblies 12 and 14 of the overall hose assembly 10 in a quick connect manner. It is further noted that due to the initial or prior mechanical engagement of the sleeve member 114 and the inner end of the inner tube member 108, as well as the mechanical engagement of the inner end portion 26 of the male connector 16 with the inner end portion 64 of the female connector 48, the threaded engagement of the joint retainer nut member 90 with the third externally threaded portion 92,94 of the male connector 16 is simplified and facilitated because the operator personnel do not have to physically hold the half hose assemblies 12 and 14 together while threading the joint retainer nut member 90 upon the male connector 16.

With reference now being made to FIG. 2, a second embodiment of the quick connect/disconnect coaxial hose assembly of the present invention is disclosed and is generally indicated by the reference character 200. This embodiment is precisely the same as the first hose assembly embodiment disclosed in FIG. 1, with the exception of one part or section thereof which will be described shortly, and consequently, detailed structure of this embodiment will not be described in any lengthy detail. In addition, only the major components of the assembly have been provided with reference characters so as to disclose the descriptive continuity of this embodiment with respect to the first embodiment disclosed in FIG. 1, and it is noted further that in connection with such reference characters, corresponding parts of the embodiments have been denoted by similar reference characters except that the reference characters of this second embodiment are in the 200 series. Still further, the half hose assemblies of this embodiment have been designated by the reference characters 213 and 215 so as to eliminate any confusion with one of the internal spacers 212 and the sleeve member 214.

More particularly, in accordance with the embodiment of FIG. 2, the male and female connectors 216 and 248 may be fabricated from a suitable plastic material, and in lieu of the male connector 16 of the half hose assembly 12 being provided with the annular recessed portion 70 and the O-ring sealing member 72 disposed therein, the inner end portion 226 of the male connector 216 may have a radial thickness which is less than that of the inner end portion 26 of the male connector 16 and may be provided with an annular, radially outwardly projecting flanged portion 227 which is adapted to engage the inner peripheral wall of the inner end portion 264 of the female connector 248 so as to provide the fluidic sealing therebetween which was similarly provided by the O-ring sealing member 72 of the embodiment of FIG. 1. In view of the fabrication of the male and female connectors 216 and 248 from a suitable plastic material, the flanged portion 227 establishes or defines a friction or interference fit with the inner peripheral wall of the inner end portion 264 of the female connector 248.

With reference now being lastly made to FIG. 3, a third embodiment of the present invention is disclosed and is generally indicated by the reference character 300. As was the case with the second embodiment of FIG. 2, this third embodiment is substantially identical to the first embodiment of FIG. 1, except for one section or part thereof which will be discussed shortly, and accordingly, a detailed description of the structure of this embodiment will not be set forth herein. In addition, only the major components of the assembly have been provided with reference characters so as to disclose the descriptive continuity of this embodiment with respect to the first and second embodiments of FIGS. 1 and 2, wherein corresponding parts of the embodiments have been denoted by similar reference characters except that the reference characters of this embodiment are in the 300 series.

More particularly, it will be recalled that in accordance with the embodiment of the invention disclosed in FIG. 1, the spacers 110 and 112 were disposed internally within the male and female connectors 16 and 48 with a friction or interference fit, and the internal diameters of the spacers 110 and 112 were just slightly larger than the outer diameters of the inner tube members 106 and 108. In accordance with the third embodiment of the present invention as disclosed in FIG. 3, the outer diameters of the spacers 310 and 312 are slightly less than the inner diameters of the male and female connectors 316 and 348 so as to permit the spacers 310 and 312 to be slidably movable with respect to the male and female connectors 316 and 348, however, the inner diameters of the spacers 310 and 312 are such with respect to the outer diameters of the inner tube members 306 and 308 as to define a friction or interference fit therewith. In addition, spring members 323 and 325 are respectively operatively associated with the spacers 310 and 312.

In particular, the spring members 323 and 325, which may be, for example, coil springs disposed about the inner tube members 306 and 308, are interposed between the axially outer ends of the spacers 310,312 and the shoulders 330,360. In this manner, the spring members 323 and 325 bias the spacers 310,312 and the inner tube members 306, 308 axially inwardly such that the sleeve member 314 and the inner ends of the inner tube members 306 and 308 are disposed at their proper axial positions. In addition, the presence of the spring members 323 and 325, as well as the friction fitting of the spacers 310 and 312 upon inner tube members 306 and 308 prevents inadvertent withdrawal of the inner tube members 306 and 308 out from the half hose assemblies 313 and 315 in view of the engagement of the spring members 323 and 325, and also that of the spacers 310 and 312, with the shoulders 330 and 360 should the inner tube members 306 and 308 be attempted to be withdrawn from the half hose assemblies 313 and 315. Still further, and similarly, the spring members 323 and 325 create a biasing force which acts axially inwardly such that the inner tube members 306 and 308 are always biased toward their mating or engaged positions. In lieu of coil springs, the spring members 323 and 325 may comprise a plurality of springs disposed in an annular or circumferential pattern around the inner tube members 306 and 308.

It is thus seen that in accordance with the teachings and principles of the present invention, a new and improved quick connect/disconnect coaxial hose assembly has been provided which not only provides for the quick connection and disconnection of the half hose assemblies with respect to each other so as to facilitate the exchange or replacement of one or more of the half hose assemblies, but in addition, each half hose assembly is comprised of substantially identical or complementary parts. Still further, straight, axial flowthrough of both fluids of the coaxial fluid system is achieved, and the assembly provides mechanical interconnections which provide or ensure both good structural and fluidic integrity.

Obviously, many modifications and variations of the present invention are possible in light of the above teachings. It is therefore to be understood that within the scope of the appended claims, the present invention may be practiced otherwise than as specifically described herein.

What is claimed as new and desired to be protected by Letters Patent of the United States of America, is:

1. A quick connect/disconnect coaxial hose assembly for conducting two fluids therethrough, comprising:

a male connector defining a first fluid flow passageway therethrough for a first fluid;

a female connector having a socket region for receiving said male connector and defining a first fluid flow passageway therethrough for said first fluid whereby said first fluid flow passageways of said male and female connectors together define a first fluid conduit for said first fluid;

a first outer tube member mounted upon said male connector and fluidically connected to said first fluid flow passageway of said male connector and said first fluid conduit for conducting said first fluid through said first fluid conduit;

a second outer tube member mounted upon said female connector and fluidically connected to said first fluid flow passageway of said female connector and said first fluid conduit for conducting said first fluid through said first fluid conduit;

a first inner tube member disposed interiorly of said first outer tube member and having an axially inner end disposed interiorly of said male connector for conducting a second fluid therethrough;

a second inner tube member disposed interiorly of said second outer tube member and having an axially inner end disposed interiorly of said female connector for conducting said second fluid therethrough;

a sleeve member fixedly mounted upon a first one of said axially inner ends of said first and second inner tube members, separably mounted upon said axially inner end of a second one of said first and second inner tube members, and fluidically connecting said axially inner ends of said first and second inner tube members together such that said first and second inner tube members and said sleeve member together define a second fluid conduit for said second fluid; and a joint retainer nut member mounted upon a first one of said male and female connectors and engaging a second one of said male and female connectors for connecting said male and female connectors together, whereupon disengagement of said joint retainer nut member from said second one of said male and female connectors, said male and female connectors, along with their respective outer and inner tube members, can be axially disconnected from each other so as to quickly disconnect said hose assembly, whereas upon axial insertion of said axially inner end of said second one of said first and second inner tube members within said sleeve member, axial insertion of said male connector within said socket region of said female connector, and engagement of said joint retainer nut member with said second one of said male and female connectors, said male and female connectors, along with said respective outer and inner tube members, can be axially connected to each other so as to quickly connect said hose assembly.

2. The assembly as set forth in claim 1, wherein:

said male connector has an externally threaded portion defined thereon;

said female connector has a radially outwardly projecting flanged portion defined thereon; and said joint retainer nut member has an internally threaded portion defined thereon for threadedly engaging said externally threaded portion of said male connector, and a radially inwardly projecting flanged portion for engaging said radially outwardly projecting flanged portion of said female connector so as to axially secure said male and female connectors together.

3. The assembly as set forth in claim 1, wherein:

said male and female connectors both have externally threaded portions defined thereon, and external frusto-conical portions defined thereon for respectively mounting said first and second outer tube members thereon; and a pair of tube retainer nut members, having internal frusto-conical portions for mating with said external frusto-conical portions of said male and female connectors, and internally threaded portions for threadedly engaging said externally threaded portions of said male and female connectors, respectively mounted upon said male and female connectors, whereby when said pair of tube retainer nut members are threadedly engaged upon said male and female connectors, said frusto-conical portions of said male and female connectors, and said pair of tube retainer nut members, cooperate to secure said first and second outer tube members upon said male and female connectors.

4. The assembly as set forth in claim 1, wherein:

said first and second outer tube members are fabricated from polyurethane.

5. The assembly as set forth in claim 1, wherein:

said first and second inner tube members are fabricated from nylon.

6. The assembly as set forth in claim 1, wherein:

said sleeve member is fabricated from nylon.

7. The assembly as set forth in claim 1, wherein:

said sleeve member is mounted upon said axially inner ends of said first and second inner tube members by means of a friction fit.

8. The assembly as set forth in claim 7, wherein:

said sleeve member is mounted upon said axially inner ends of said first and second inner tube members in such a manner that a first predetermined axial length of said sleeve member is mounted upon said one of said first and second inner tube members, while a second predetermined axial length, which is less than said first predetermined axial length, is mounted upon said other one of said first and second inner tube members so as to ensure that said sleeve member remains fixedly mounted upon said one of said first and second inner tube members and separably mounted upon said other one of said first and second inner tube members.

9. The assembly as set forth in claim 1, further comprising:

spacer means disposed internally of said male and female connectors and around said first and second inner tube members for maintaining said first and second inner tube members coaxially spaced with respect to said first and second outer tube members.

10. The assembly as set forth in claim 9, wherein:

said spacer means comprise three-legged spacers fabricated from a molded plastic material.

11. The assembly as set forth in claim 1, further comprising:

annular recessed means defined upon said male connector; and

O-ring sealing means disposed within said annular recessed means of said male connector and engaging said socket region of said female connector for sealing the connection defined between said male and female connectors.

12. The assembly as set forth in claim 1, wherein:

said male connector comprises a radially outwardly projecting flanged portion for engaging said socket region of said female connector so as to seal the connection defined between said male and female connectors.

13. The assembly as set forth in claim 1, wherein:

said spacer means are fixedly mounted upon said first and second inner tube members; and spring means are respectively interposed between said spacer means and said male and female connectors for axially biasing said first and second inner tube members toward each other.

14. A quick connect/disconnect coaxial hose assembly for conducting two fluids therethrough, comprising:

a male half hose assembly comprising a male connector defining a first fluid flow passageway therethrough for a first fluid; a first outer tube member mounted upon said male connector and fluidically connected to said first fluid flow passageway of said male connector for conducting said first fluid through said first fluid flow passageway of said male connector; and a first inner tube member disposed interiorly of said first outer tube member and having an axially inner end disposed interiorly of said male connector for conducting a second fluid therethrough;

a female half hose assembly comprising a female connector having a socket region for receiving said male connector and defining a first fluid flow passageway therethrough for said first fluid whereby said first fluid flow passageways of said male and female connectors together define a first fluid conduit for said first fluid; a second outer tube member mounted upon said female connector and fluidically connected to said first fluid flow passageway of said female connector and said first fluid conduit for conducting said first fluid through said first fluid conduit; and a second inner tube member disposed interiorly of said second outer tube member and having an axially inner end disposed interiorly of said female connector for conducting said second fluid therethrough;

a sleeve member fixedly mounted upon a first one of said axially inner ends of said first and second inner tube members, separably mounted upon said axially inner end of a second one of said first and second inner tube members, and fluidically connecting said axially inner ends of said first and second inner tube members together such that said first and second inner tube members and said sleeve member together define a second fluid conduit for said second fluid; and a joint retainer nut member mounted upon a first one of said male and female connectors and engaging a second one of said male and female connectors for connecting said male and female connectors together, whereupon disengagement of said joint retainer nut member from said second one of said male and female connectors, said male and female connectors, along with their respective outer and inner tube members, can be axially disconnected from each other so as to quickly disconnect said hose assembly, whereas upon axial insertion of said axially inner end of said second one of said first and second inner tube members within said sleeve member, axial insertion of said male connector within said socket region of said female connector, and engagement of said joint retainer nut member with said second one of said male and female connectors, said male and female connectors, along with said respective outer and inner tube members, can be axially connected to each other so as to quickly connect said hose assembly.

15. The assembly as set forth in claim 14, wherein:

said male connector has an externally threaded portion defined thereon;

said female connector has a radially outwardly projecting flanged portion defined thereon; and said joint retainer nut member has an internally threaded portion defined thereon for threadedly engaging said externally threaded portion of said male connector, and a radially inwardly projecting flanged portion for engaging said radially outwardly projecting flanged portion of said female connector so as to axially secure said male and female connectors together.

16. The assembly as set forth in claim 14, wherein:

said male and female connectors both have externally threaded portions defined thereon, and external frusto-conical portions defined thereon for respectively mounting said first and second outer tube members thereon; and a pair of tube retainer nut members, having internal frusto-conical portions for mating with said external frusto-conical portions of said male and female connectors, and internally threaded portions for threadedly engaging said externally threaded portions of said male and female connectors, respectively mounted upon said male and female connectors, whereby when said pair of tube retainer nut members are threadedly engaged upon said male and female connectors, said frusto-conical portions of said male and female connectors, and said pair of tube retainer nut members, cooperate to secure said first and second outer tube members upon said male and female connectors.

17. The assembly as set forth in claim 14, wherein:

said sleeve member is mounted upon said axially inner ends of said first and second inner tube members by means of a friction fit.

18. The assembly as set forth in claim 17, wherein:

said sleeve member is mounted upon said axially inner ends of said first and second inner tube members in such a manner that a first predetermined axial length of said sleeve member is mounted upon said one of said first and second inner tube members, while a second predetermined axial length, which is less than said first predetermined axial length, is mounted upon said other one of said first and second inner tube members so as to ensure that said sleeve member remains fixedly mounted upon said one of said first and second inner tube members and separably mounted upon said other one of said first and second inner tube members.

19. The assembly as set forth in claim 14, further comprising:

spacer means disposed internally of said male and female connectors and around said first and second inner tube members for maintaining said first and second inner tube members coaxially spaced with respect to said first and second outer tube members.

20. The assembly as set forth in claim 19, wherein:

said spacer means are fixedly mounted upon said first and second inner tube members; and spring means are respectively interposed between said spacer means and said male and female connectors for axially biasing said first and second inner tube members toward each other.

* * * * *